US009344183B2

(12) United States Patent
Eiger et al.

(10) Patent No.: US 9,344,183 B2
(45) Date of Patent: May 17, 2016

(54) WIRELESS MULTIMEDIA SYSTEM

(75) Inventors: Tuvia Eiger, North Bellmore, NY (US); Uriel Berchin, Forest Hills, NY (US)

(73) Assignee: Be-Labs, Inc., Forest Hills, NY (US)

( * ) Notice: Subject to any disclaimer, the term of this patent is extended or adjusted under 35 U.S.C. 154(b) by 660 days.

(21) Appl. No.: 12/896,548

(22) Filed: Oct. 1, 2010

(65) Prior Publication Data

US 2012/0014464 A1    Jan. 19, 2012

Related U.S. Application Data

(63) Continuation of application No. 09/796,270, filed on Feb. 28, 2001, now Pat. No. 7,827,581.

(60) Provisional application No. 60/185,862, filed on Feb. 29, 2000.

(51) Int. Cl.
*H04N 7/173* (2011.01)
*H04B 7/185* (2006.01)
(Continued)

(52) U.S. Cl.
CPC .. *H04B 7/1858* (2013.01); *H04B 2201/709709* (2013.01); *H04Q 2213/13098* (2013.01);
(Continued)

(58) Field of Classification Search
CPC .......... H04N 21/436; H04N 21/43615; H04N 21/4363; H04N 21/43637; H04N 21/6408; H04B 7/1858; H04B 2201/709709; H04Q 2213/13098; H04Q 2213/13242; H04Q 2213/13248; H04Q 2213/13376; H04Q 2213/13389; H04W 28/04; H04W 88/04
USPC ........ 370/431, 208, 203; 455/173; 725/80–81
See application file for complete search history.

(56) References Cited

U.S. PATENT DOCUMENTS 5,175,550 A    12/1992    Kattmann et al.
5,282,222 A *    1/1994    Fattouche et al. ............. 375/260
(Continued)

FOREIGN PATENT DOCUMENTS

EP      0 935 364 A2    12/1998
EP      1 410 675 A4    4/2004
(Continued)

OTHER PUBLICATIONS da Silva, Alexandre; Performance of OFDM COmmunication Systems in Tunnes; IEEE Apr. 1999; pp. 2908-2912.*
(Continued)

*Primary Examiner* — Pankaj Kumar
*Assistant Examiner* — Reuben M Brown
(74) *Attorney, Agent, or Firm* — Kirschstein, Israel, Schiffmiller & Pieroni, P.C.

(57) ABSTRACT

A customer premises installation has a wireless multimedia center (WMC) for reception from one or more signal sources and for distribution of segments of signals from signal sources through the wireless multimedia center to a plurality of end units, in which the signals include video signals and broadband data. The wireless multimedia center receives all the signals and distributes segments of said signals via a transmitter. The video signals are transmitted by orthogonal frequency division multiplexing in which all signals are added together and summed as an orthogonal array having dimensions of time, frequency and amplitude, to transmit spread spectrum multiplexed signals. Each pulse has sufficiently long individual pulse widths to defeat multi-path, reflection and absorption phase induced losses. The video signals are distributed to one or more end units. The end units communicate with the wireless multimedia center, controlling which segments of which signals are distributed to each end unit.

23 Claims, 8 Drawing Sheets

(51) Int. Cl.
*H04N 7/16* (2011.01)
*H04W 28/04* (2009.01)
*H04W 88/04* (2009.01)

(52) U.S. Cl.
CPC ............ *H04Q2213/13242* (2013.01); *H04Q 2213/13248* (2013.01); *H04Q 2213/13376* (2013.01); *H04Q 2213/13389* (2013.01); *H04W 28/04* (2013.01); *H04W 88/04* (2013.01)

(56) References Cited

U.S. PATENT DOCUMENTS

| | | | |
|---|---|---|---|
| 5,371,548 A | 12/1994 | Williams | |
| 5,398,070 A | 3/1995 | Lee | |
| 5,613,190 A | 3/1997 | Hylton | |
| 5,630,204 A | 5/1997 | Hylton et al. | |
| 5,708,961 A * | 1/1998 | Hylton et al. | 725/81 |
| 5,729,535 A | 3/1998 | Rostoker et al. | |
| 5,732,113 A * | 3/1998 | Schmidl et al. | 375/355 |
| 5,758,257 A | 5/1998 | Herz et al. | |
| 5,793,413 A | 8/1998 | Hylton et al. | |
| 5,794,116 A | 8/1998 | Matsuda et al. | |
| 5,835,128 A | 11/1998 | MacDonald et al. | |
| 5,880,721 A | 3/1999 | Yen | |
| 5,936,949 A | 8/1999 | Pasternak et al. | |
| 5,953,311 A * | 9/1999 | Davies et al. | 370/210 |
| 6,069,896 A * | 5/2000 | Borgstahl et al. | 370/401 |
| 6,088,398 A * | 7/2000 | Wahlqvist et al. | 375/260 |
| 6,124,878 A | 9/2000 | Adams et al. | |
| 6,130,622 A | 10/2000 | Hussey et al. | |
| 6,130,922 A | 10/2000 | Stott et al. | |
| 6,131,130 A | 10/2000 | Van Ryzin | |
| 6,134,223 A | 10/2000 | Burke et al. | |
| 6,151,295 A * | 11/2000 | Ma et al. | 370/203 |
| 6,151,490 A | 11/2000 | Schultheiss | |
| 6,173,326 B1 | 1/2001 | Collins | |
| 6,175,550 B1 * | 1/2001 | van Nee | 370/206 |
| 6,188,684 B1 | 2/2001 | Setoyama et al. | |
| 6,317,409 B1 * | 11/2001 | Murakami | 370/203 |
| 6,353,929 B1 | 3/2002 | Houston | |
| 6,398,070 B1 | 6/2002 | Uchida | |
| 6,414,986 B1 * | 7/2002 | Usui | 375/142 |
| 6,493,875 B1 * | 12/2002 | Eames et al. | 725/81 |
| 6,546,055 B1 * | 4/2003 | Schmidl et al. | 375/244 |
| 6,560,234 B1 | 5/2003 | Ben-Michael et al. | |
| 6,563,858 B1 * | 5/2003 | Fakatselis | H04B 1/707 375/148 |
| 6,578,200 B1 * | 6/2003 | Takao et al. | 725/54 |
| 6,609,010 B1 * | 8/2003 | Dolle et al. | 455/552.1 |
| 6,704,374 B1 * | 3/2004 | Belotserkovsky et al. | 375/326 |
| 6,795,424 B1 * | 9/2004 | Kapoor et al. | 370/343 |
| 6,810,007 B1 * | 10/2004 | Kim | 370/208 |
| 7,035,897 B1 * | 4/2006 | Devereaux | H04L 67/04 348/211.99 |
| 7,054,296 B1 * | 5/2006 | Sorrells et al. | 370/338 |
| 7,827,581 B1 * | 11/2010 | Eiger et al. | 725/81 |
| 2005/0025042 A1 * | 2/2005 | Hadad | 370/208 |
| 2005/0186956 A1 * | 8/2005 | Grindahl et al. | 455/422.1 |
| 2005/0207334 A1 * | 9/2005 | Hadad | 370/203 |
| 2006/0227851 A1 * | 10/2006 | Shattil | 375/133 |

FOREIGN PATENT DOCUMENTS

| | | |
|---|---|---|
| EP | 2 418 872 A1 | 2/2012 |
| EP | 2 418 873 A1 | 2/2012 |
| IT | 1281947 | 4/1995 |
| JP | 11-55211 | 2/1999 |
| WO | 02/019623 | 7/2002 |
| WO | 02/069667 A1 | 9/2002 |
| WO | 2006/131955 | 12/2006 |

OTHER PUBLICATIONS

Benedetto, Valter; Performance of the COFDM Systems with Waveform Shaping; IEEE Aug. 1997; pp. 1241-1245.*
Halsall, F.; High Bit Rate Data Transmissions Within Buildings for Wirless Digital Cameras; IEEE Sep. 1995; pp. 35-40.*
Miller, R.J.; OFDM Desgin Considerations using the HF Fading CHannel; IEEE 1995; pp. 1-6.*
International Search Authority of United States Patent and Trademark Office, "PCT International Preliminary Examination Report," Sep. 12, 2003, PCT International Application No. PCT/US2002/06140 [4 pages].
Eiger, et al., "Wireless Multimedia System," U.S. Appl. No. 09/796,270, mailed Feb. 28, 2001.
Eiger, et al., "Preliminary Amendment," U.S. Appl. No. 09/796,270, mailed Sep. 18, 2002.
U.S. Patent & Trademark Office (USPTO), "Non-Final Office Action," U.S. Appl. No. 09/796,270, mailed Mar. 23, 2005.
Eiger, et al., "Response to Non-Final Office Action," U.S. Appl. No. 09/796,270, mailed Sep. 23, 2005.
USPTO, "Final Office Action," U.S. Appl. No. 09/796,270, mailed Dec. 29, 2005.
USPTO, "Examiner's Interview Summary," U.S. Appl. No. 09/796,270, mailed Feb. 7, 2006.
Eiger, et al., "Amendment After Final Office Action," U.S. Appl. No. 09/796,270, mailed Feb. 21, 2006.
USPTO, "Advisory Action," U.S. Appl. No. 09/796,270, mailed Mar. 31, 2006.
Eiger, et al., "Appeal Brief," U.S. Appl. No. 09/796,270, mailed May 30, 2006.
Eiger, et al., "Supplemental Appeal Brief," U.S. Appl. No. 09/796,270, mailed May 31, 2006.
USPTO, "Notice of Non-Compliant Appeal Brief," U.S. Appl. No. 09/796,270, mailed Aug. 25, 2006.
Eiger, et al., "Appeal Brief," U.S. Appl. No. 09/796,270, mailed Sep. 11, 2006.
USPTO, "Examiner's Answer to Appeal Brief," U.S. Appl. No. 09/796,270, mailed Nov. 30, 2006.
Eiger, et al., "Reply Brief," U.S. Appl. No. 09/796,270, mailed Jan. 30, 2007.
USPTO, "Examiner's Answer to Reply Brief," U.S. Appl. No. 09/796,270, mailed Mar. 7, 2007.
USPTO, "Board of Patent Appeals and Interferences (BPAI) Decision," U.S. Appl. No. 09/796,270, mailed Jul. 15, 2009.
USPTO, "BPAI Record," U.S. Appl. No. 09/796,270, mailed Aug. 6, 2009.
USPTO, "Examiner's Interview Summary," U.S. Appl. No. 09/796,270, mailed Nov. 4, 2009.
Eiger, et al., "Amendment After BPAI Decision," U.S. Appl. No. 09/796,270, mailed Nov. 14, 2009.
USPTO, "Examiner's Interview Summary," U.S. Appl. No. 09/796,270, mailed Nov. 16, 2009.
USPTO, "Examiner's Interview Summary," U.S. Appl. No. 09/796,270, mailed Mar. 10, 2010.
Eiger, et al., "Amendment After BPAI Decision," U.S. Appl. No. 09/796,270, mailed Mar. 17, 2010.
USPTO, "Notice of Allowance," U.S. Appl. No. 09/796,270, mailed Jun. 25, 2010.
USPTO, "Issue Notification," U.S. Appl. No. 09/796,270, mailed Oct. 13, 2010.
European Patent Office, "European Search Report and Opinion," Jan. 16, 2012, European Patent Application No. 11183193.9 [6 pages].
European Patent Office, "European Search Report and Opinion," Jan. 17, 2012, European Patent Application No. 11183195.4 [6 pages].
Parsons, J.D., "7.3 Propagation Inside Buildings," *The Mobile Radio Propagation Channel*, 1992, p. 194-195, Halsted Press, New York, USA.
Tam, W.K. and Tran, V.N., "Propagation Modelling for Indoor Wireless Communication," *Electronics & Communication Engineering Journal*, Oct. 1995, pp. 221-228.

* cited by examiner

WIRELESS MULTIMEDIA SYSTEM

CROSS-REFERENCE TO RELATED APPLICATIONS

This is a continuation of application Ser. No. 09/796,270, filed Feb. 28, 2001 now U.S. Pat. No. 7,827,581 which claims benefit of Provisional Patent Application 60/185,862 filed Feb. 29, 2000, both of which are hereby incorporated by reference.

BACKGROUND OF THE INVENTION

Field of the Invention

This invention relates to a wireless distribution system for home or business comprising a unitary distribution box, called a wireless multimedia center, which has inputs for receiving signals from one or more sources. Signals are then re-broadcast throughout the site by low energy digital transmissions, at energy levels just above background radiation. These signals are transmitted to and received by individual transceivers, called end units (EU), located throughout the site.

BRIEF SUMMARY OF THE INVENTION

This invention relates to a wireless distribution system for home or business comprising a unitary distribution box, called a wireless multimedia center (WMC), which has inputs for receiving signals from one or more of: a satellite dish; a terrestrial antenna such as a VHF/UHF; a cable line; a telephone or data line such as ISDN, DSL, etc.; and/or fiber optic line, and any other future data or program sources can also be transparently input to the WMC with appropriate modifications or modular plug-ins.

Signals input are then re-broadcast using OFDM technology throughout the premises by low energy digital transmissions, at energy levels just above background radiation. These signals are transmitted to and received by individual transceivers, called end units (EU), located throughout the premises. These EU transceivers are presently contemplated as a video end unit (VEU) for TV and radio, and a communications end unit (CEU), for telephone and data.

The data channel instructs the WMC which program and data signals to send to which EU. Special multiplexing techniques result in extraordinary bandwidth and channel capacity.

DETAILED DESCRIPTION OF THE INVENTION

Figure 1:
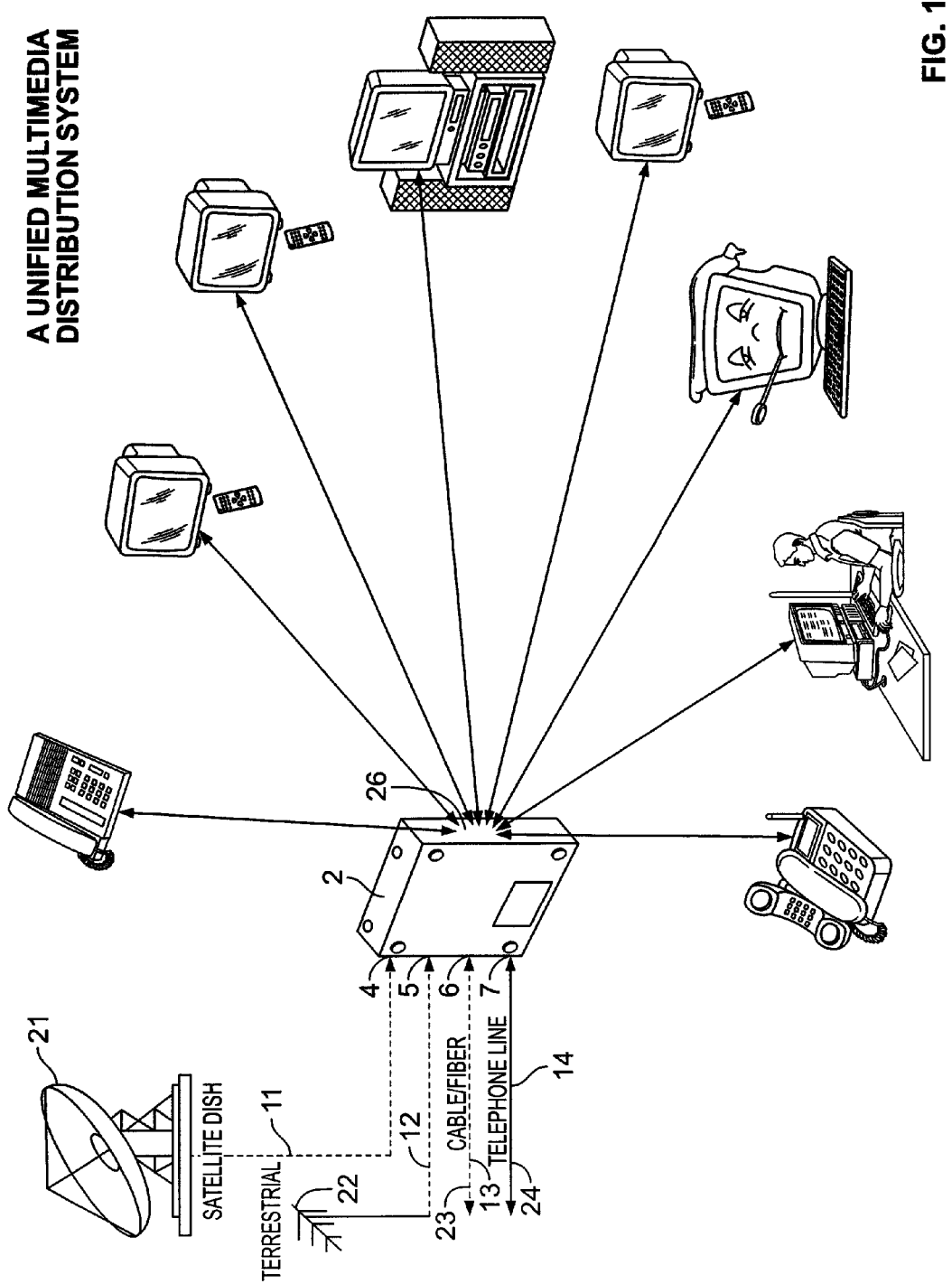
FIG. 1 is a block diagram of a unified multimedia distribution system of the present invention

As in FIG. 1, this invention relates to a wireless distribution system for home or business, comprising a unitary distribution box 2, called a wireless multimedia center (WMC), which has inputs for receiving signals 11-14 from one or more of:
   a satellite dish 21;
   a terrestrial antenna 22;
   a cable input/output line 23; and/or
   a telephone or data line 24 [ISDN, DSL, etc].

Signals input are then re-broadcast throughout the premises by low energy digital transmissions 26 using OFDM technology, at energy levels just above background radiation. As in FIG. 2, these signals are transmitted to, and received by, individual transceivers 31-36 located throughout the premises. These transceivers are presently contemplated as:
   video end unit 31-33, for
      television receivers 41-43;
      VCRs;
      AM/FM broadcasting;
   Communications end unit 34-36, for:
      computers 46;
      telephones 36,
      faxes,
      answering machines,
      other telephonic devices, and
      any other electronic apparatus.

Figure 4:
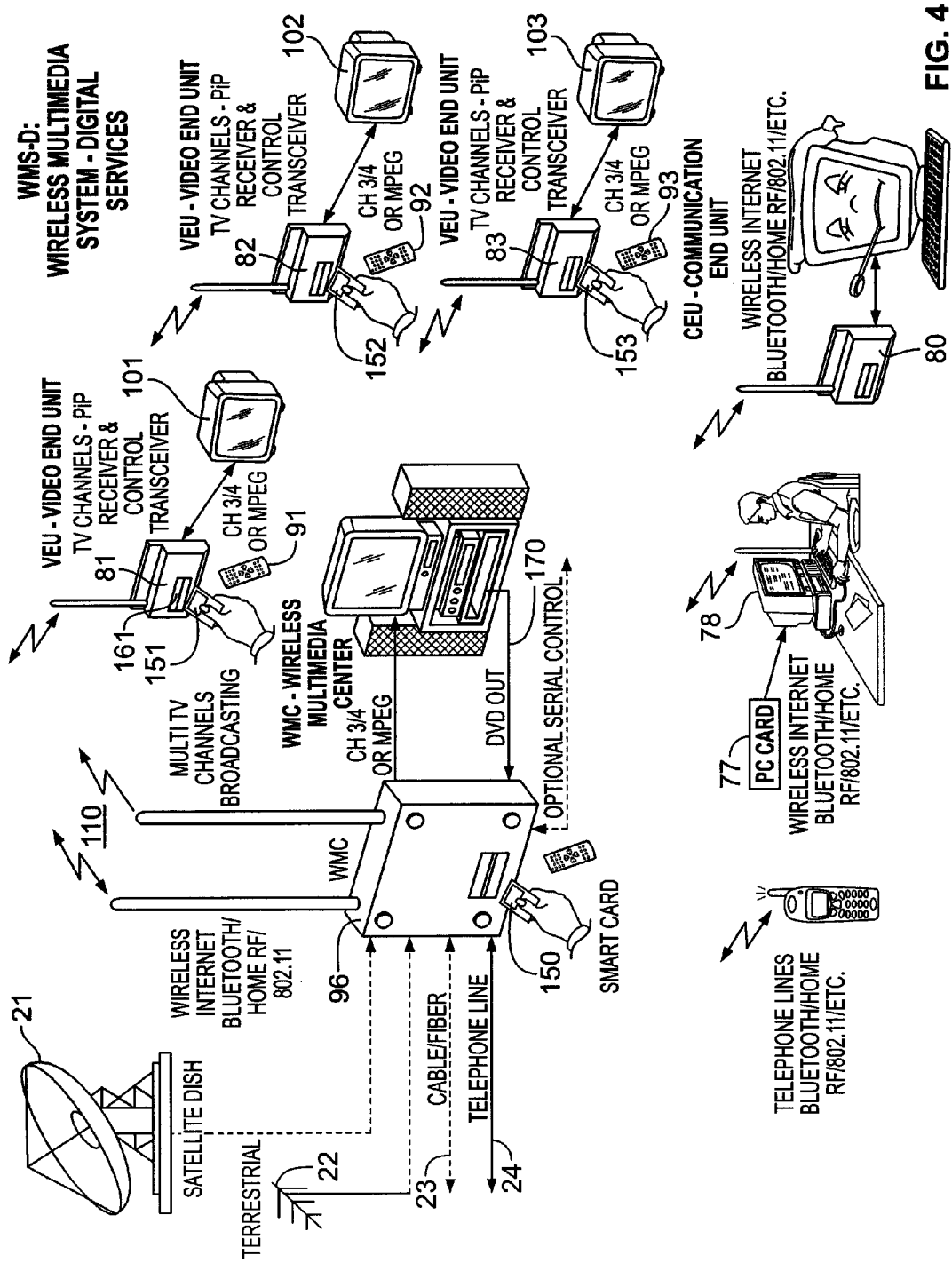
FIG. 4 is a block diagram of a unified multimedia distribution system of the present invention showing digital services.

FIG. 4 shows a universal end unit 47, incorporating both Analog VEU 48 and digital VEU 49 and a CEU 50.

A VEU may be a set-top box 31-33 (FIG. 2) or may be incorporated in a TV set instead of, or in addition to, a conventional tuner. As in FIG. 3, an analog VEU 48 will incorporate a digital to analog converter 52 and analog connectors, such as RCA connectors 61-63, SVHS 64, or RF co-ax 65 on a set top box.

Figure 3:
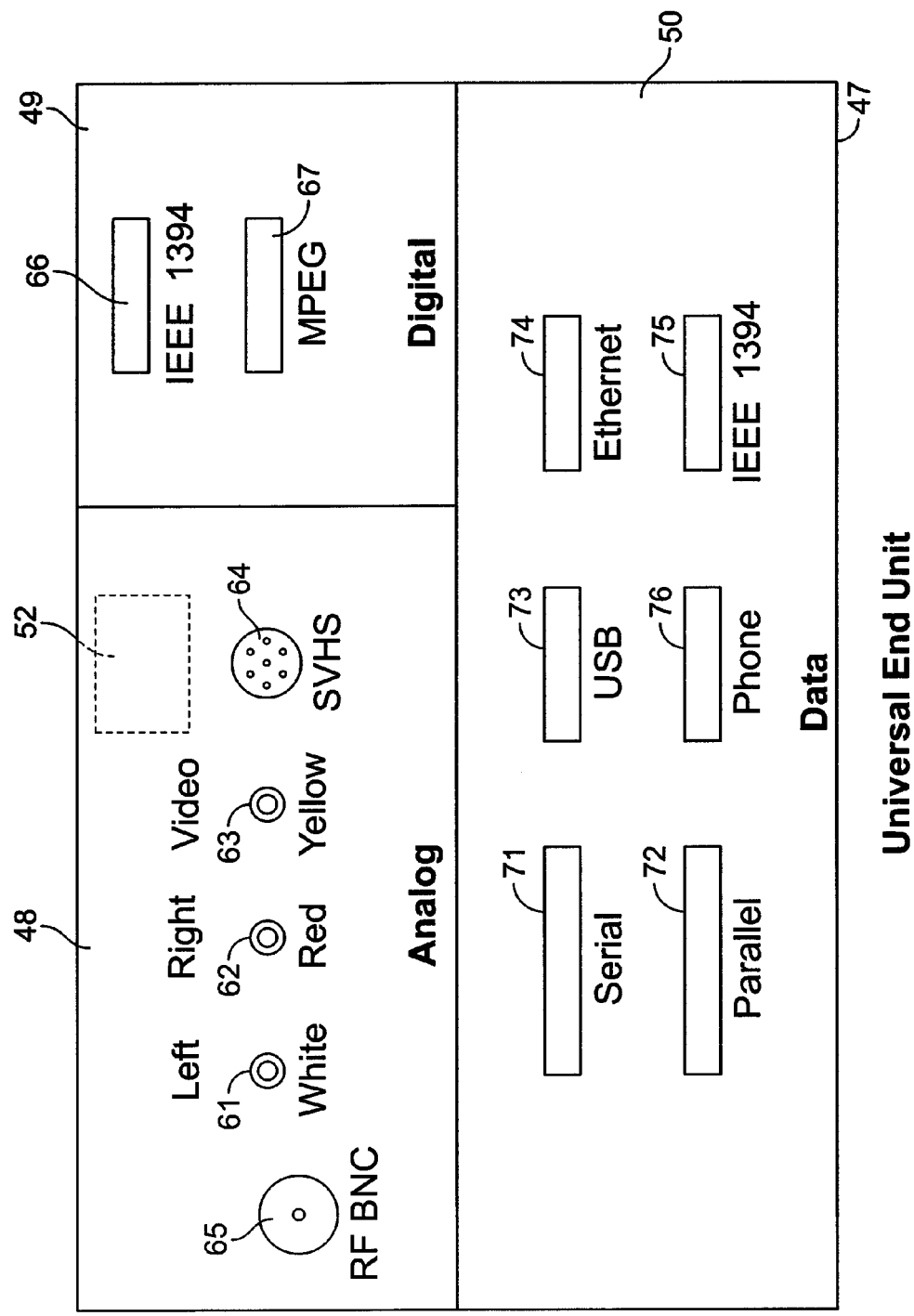
FIG. 3 is an elevation of a connector mounting surface of an end unit of the present invention.

As in FIG. 3, a digital VEU 49 can omit the digital to analog converter and will have digital connectors, on a set top box, such as IEEE 1394 66, and/or MPEG 67 connectors.

An EU can be universal, analog, digital or both, communications, or any combination.

The telephones may either: have wireless communications end units as adapters, or may be standard digital encrypted cordless phones, operating on standard digital cordless phone signals, whereby the wireless multimedia center (WMC) takes the place of various telephone base stations in transmitting the cordless telephone signals throughout the house.

Transceiving communications end units (CEU) may be separate boxes 50 with various ports such as: serial 71, parallel 72, USB 73, Ethernet 74, IEEE 1394 75 or telephone-and/or-fax-and/or-modem 76. Alternatively, as in FIG. 4, a CEU PC card 77 may be inserted into a computer 78.

Transceiving end units 80 may be adapted to Internet communication terminals; lap-top computers; or personal information managers, such as the Palm Pilot™.

Where the transceiver is a video end unit 81-83, an associated remote control unit 91-93 selects programming that will be transmitted from the WMC 96, and displayed on the television or radio receiver 101-103 associated with that video end unit 91-93. Thus, where there were 3 TVs 101-103 in the house, there would be 3 video end units 91-93, one for each television receiver 101-103. Each video end unit 81 would have its own remote controller 91 capable of selecting channel sourcing from satellite dish 21, cable 23, roof antenna 22, or any other program source. The video end unit 81 would tell the WMC 96 what signal the VEU was instructed to receive, and the wireless multimedia center (WMC) 96 would select and tune in on that signal and direct a transmission 110 receivable by that video end unit 81. Each video end unit 81 can be instructed to receive two channels to provide picture-in-picture, or a single channel in which the WMC incorporates a first and a second program as a picture-in-picture. VEU's can receive other services such as custom individually tailored advertisements or billing messages, possibly as picture-in-picture.

Software for the system, including video, computer or programmable telephonic services can be maintained and upgraded remotely by the service provider.

Similar simultaneous services, such as simultaneous fax and telephone or individually tailored on-hold messages, can use the multichannel capability of each end unit: VEU or communications end unit.

The multiple video end units could be simultaneously receiving streaming digital data from the central control unit for as many different programs as the allocated channels allow. Each digital channel in the present scheme allows up to 10 simultaneous programs to be transmitted to 10 different end units in the available bandwidth. This limit of ten is a matter of present convenience and may vary in future embodiments.

Figure 2:
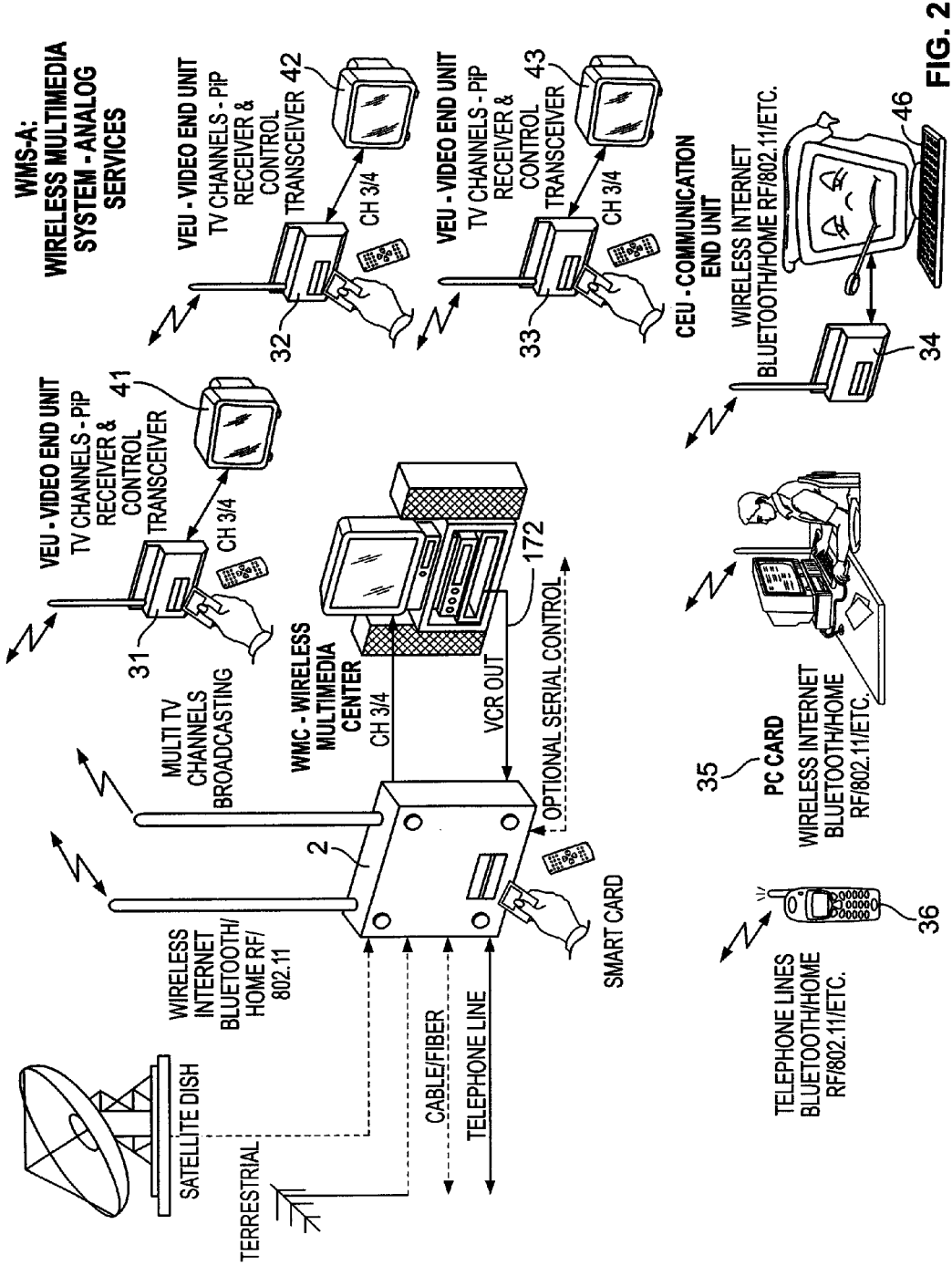
FIG. 2 is a a similar block diagram for analog services.

As in FIG. 2, where the television receivers 41-43 are standard analog television sets, the Analog System would include a digital-to-analog converter 52 (FIG. 3) to convert the digital transmissions throughout the house (FIG. 2) to an analog signal interpretable by the receiver 41-43.

In FIG. 4, as digital television becomes more common, the digital-to-analog converter part of the system can be dispensed with, and all the television data can be transmitted over the network in a digital fashion. FIG. 2, entitled WMS-A shows the system adapted to analog television receivers, while FIG. 4, WMS-D shows the system adapted to digital television systems.

Figure 5:
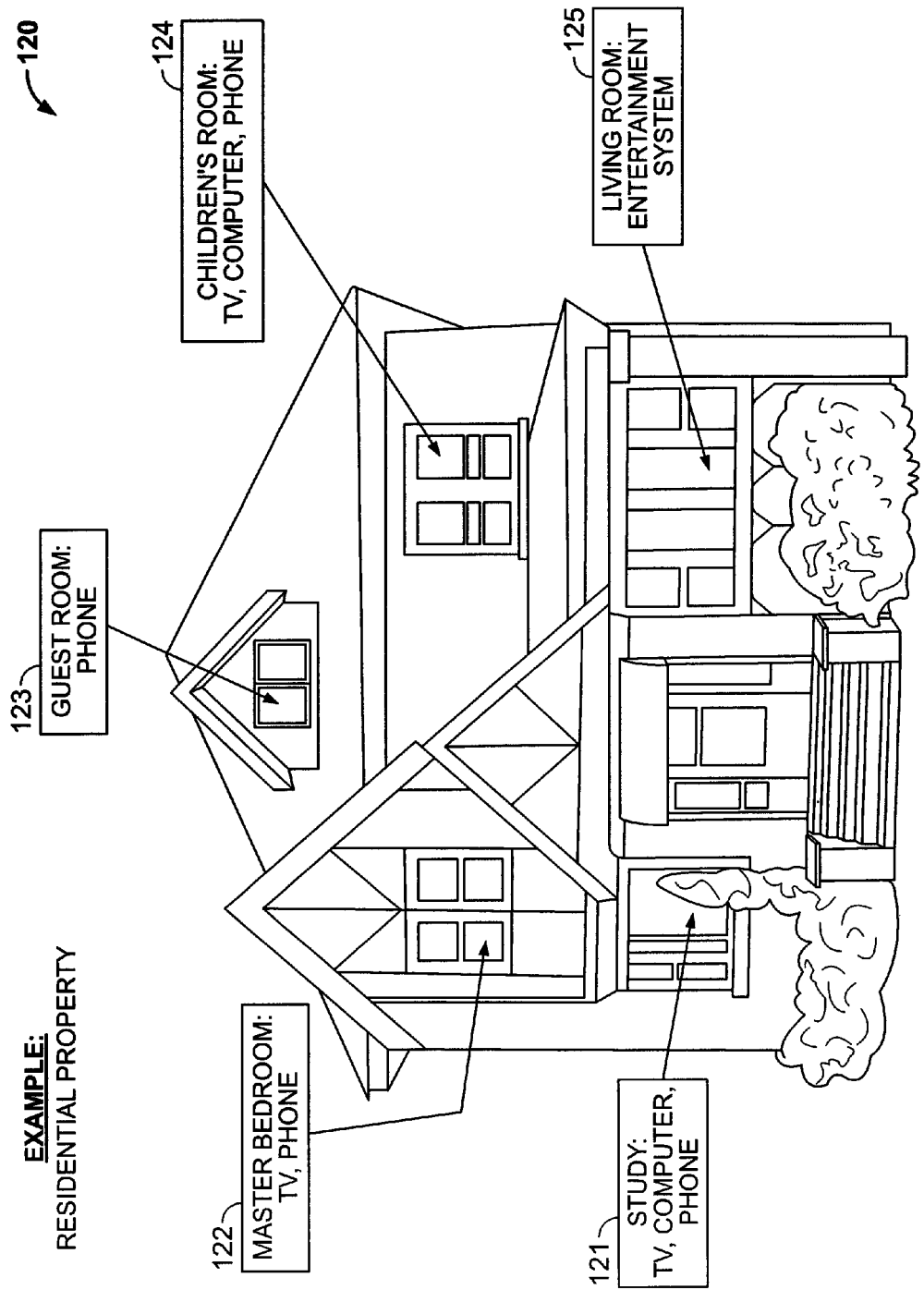
FIG. 5 is representational block diagram of the invention in a home environment. p

In FIG. 5, Example: Residential Property, the services distributed throughout a house 120 are indicated. In this residential property example, a single WMC distributes the services shown to end units located as indicated 121-125 in the various rooms.

Figure 6:
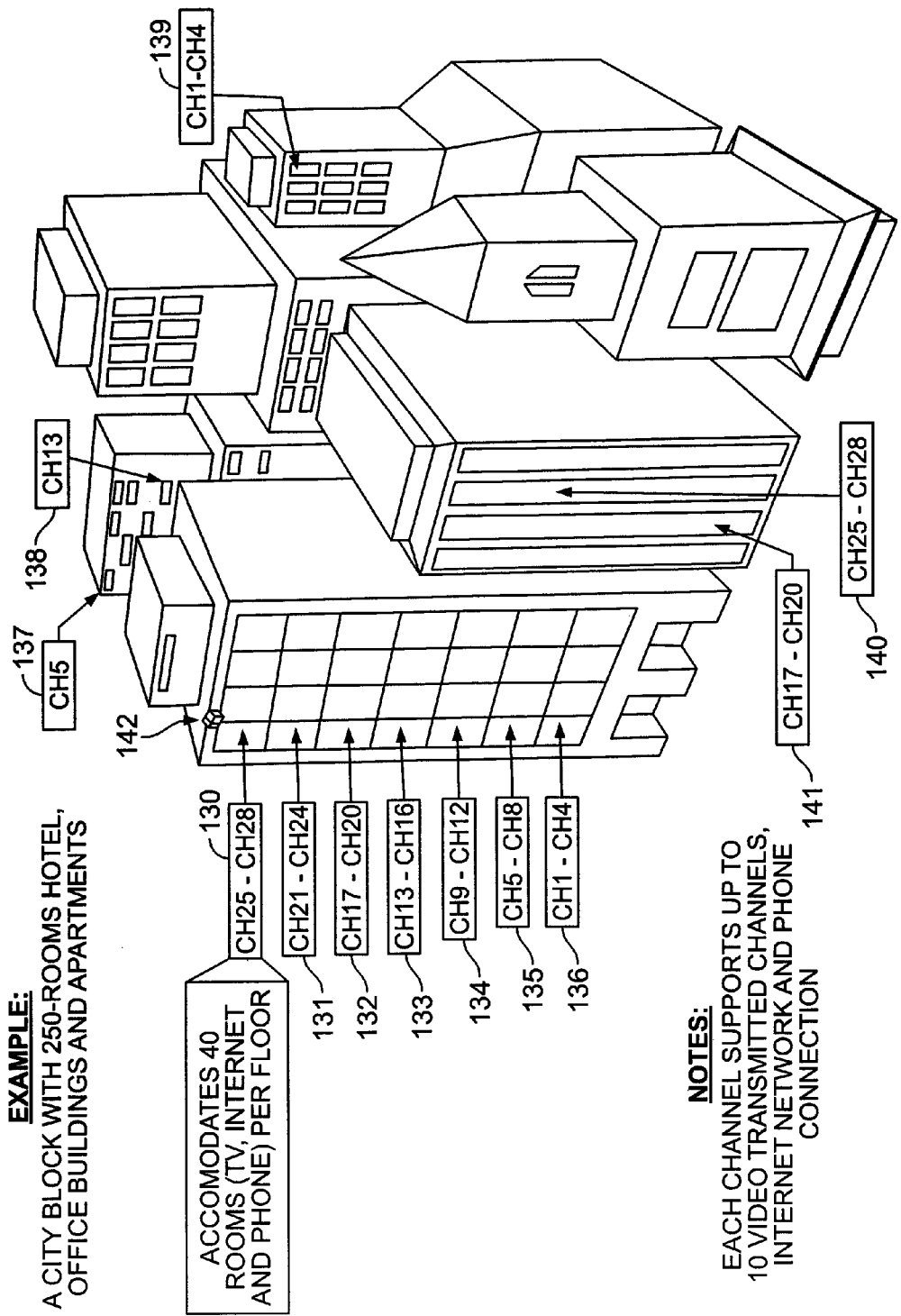
FIG. 6 is a representational block diagram of the invention in a commercial environment.

In FIG. 6, Example: a City Block . . . , channel allocation and distribution on a given city block, using different channels 130-136 to avoid cross-talk in the different user's services, in a tight geographical area, is shown. There is some attempt to separate the channels, (such as 136 vs. 139; 130 vs. 140; 132 vs. 141) by distance to avoid cross-talk, but such separation is not necessary; it only serves as an added degree of insurance, because each signal will be digitally encoded and will be incapable of being read by another digital receiver, not programmed to receive the intended signal. In a spread out system such as this, additional WMC's or special repeaters 142 may be used to reach the most distant parts of the system.

Power transmission levels are automatically chosen to minimize additional radiation to the inhabitants and to minimize interference with users of similar systems in near locations, while guaranteeing the needed quality of service. The power level minimization also combines with the aforementioned digital encoding to minimize the risk of cross-talk and interference between multiple systems in tight geographic areas.

In general a video protocol received by the WMC will be the video output by the VEU, but the system can also be a protocol converter.

Some of the features which are contemplated by the present system are:

It will be capable of carrying all analog video protocols by being electronically transparent to such protocols.

It will provide picture-in-picture service for every video end unit.

It will distribute cable, satellite, terrestrial feeds, fiber-optic or any other feed, throughout its system.

It will interface to cable/digital subscriber line or POTS modems, either internal to the computer or external to the computer.

It will provide a data feed to all end unit computers in the system area via a wideband data pipe (WDP) and thereby create a network.

It may be adapted to any data protocol such as bluetooth, home RF, 802.11, or proprietary protocol, via soft-RF. Soft RF is essentially a software conveyor that can accommodate any protocol plug-in.

As in FIG. 4, It will be smart card 150-154 controlled, so that a subscriber to a service can take his smart card 151, insert it into a local reader 161, which will identify him as being at a local system, and enable him to use his paid-for services on that system, regardless of what services the local system owner has paid to subscribe to.

Since there are no moving parts, the system will be nearly maintenance free. Software type maintenance may be remotely effected by the provider.

The system will allow a central connection for DVD 170, pre-paid programming, video camera, VCR 172 (FIG. 2), or time shifting apparatus such as a video hard drive, transmitted to one or more of the VEU's 31-33 or 81-83 in FIG. 4.

The digital system of FIG. 4 contemplates similar features with the difference that it will be able to read all digital video standards.

One of the benefits of this system will be to create a family of wireless distribution systems. The system is a two-way communication system between the providers and the users. The providers will be able to monitor the use of given copyrighted intellectual property, such as computer programs or movies, and charge royalties for the use of such intellectual property automatically, on-line, and in a way that cannot be scammed easily. The proper royalties on copyrights and on patents can be easily monitored centrally in this system, and accounted for in a trustworthy automatic way. The system could obsolete the Neilsen TV rating system.

Various chip sets and chips can be provided for the central unit, and for the video end units, to allow integration with existing television sets or for other applications requiring data transmission within the structure or area, for applications that may not even yet be contemplated. The system is modular in the use of such chips, and in the easy addition of end units.

It can operate in the unlicenced frequency bands of 5.0-5.8 gigahertz and 2.4-2.5 gigahertz or in any other appropriate frequencies that are made available by the electromagnetic spectrum licensing authorities in the various countries. Television data can use MPEG-1 and MPEG-2 compression, and/or AC3, transmission and multiplexing standards.

As described above, the system makes use of existing standards. However the system also contemplates novel transmission schemes as described below.

A proprietary modulation engine will accommodate the indoor environment.

The Inventors have come up with a proprietary design for simultaneous transmission of the video/audio, wideband data and communications.

The system enables the interception and distribution of multiple services such as telephone, radio, television, digital data, and Internet in a single control box and the distribution of those services throughout the location by wireless digital transmission, to end nodes, that are either specialized or multi-purpose, throughout the site.

The typical home unit is contemplated as having distribution capability for at least three televisions, but the invention contemplates modular add-ons that will increase this capability as needed. As for example in FIG. 6.

The system contemplates an ability to adapt to new services not known at this time.

The service contemplates a business model in which services may be charged per user, rather than per location. This would be implemented by the provision of a smart card 150-153 (FIG. 4) for each user, whereby the user could access his accustomed blend of services whenever he is in a location using the system, regardless of what services are subscribed to by the local user.

Figure 7:
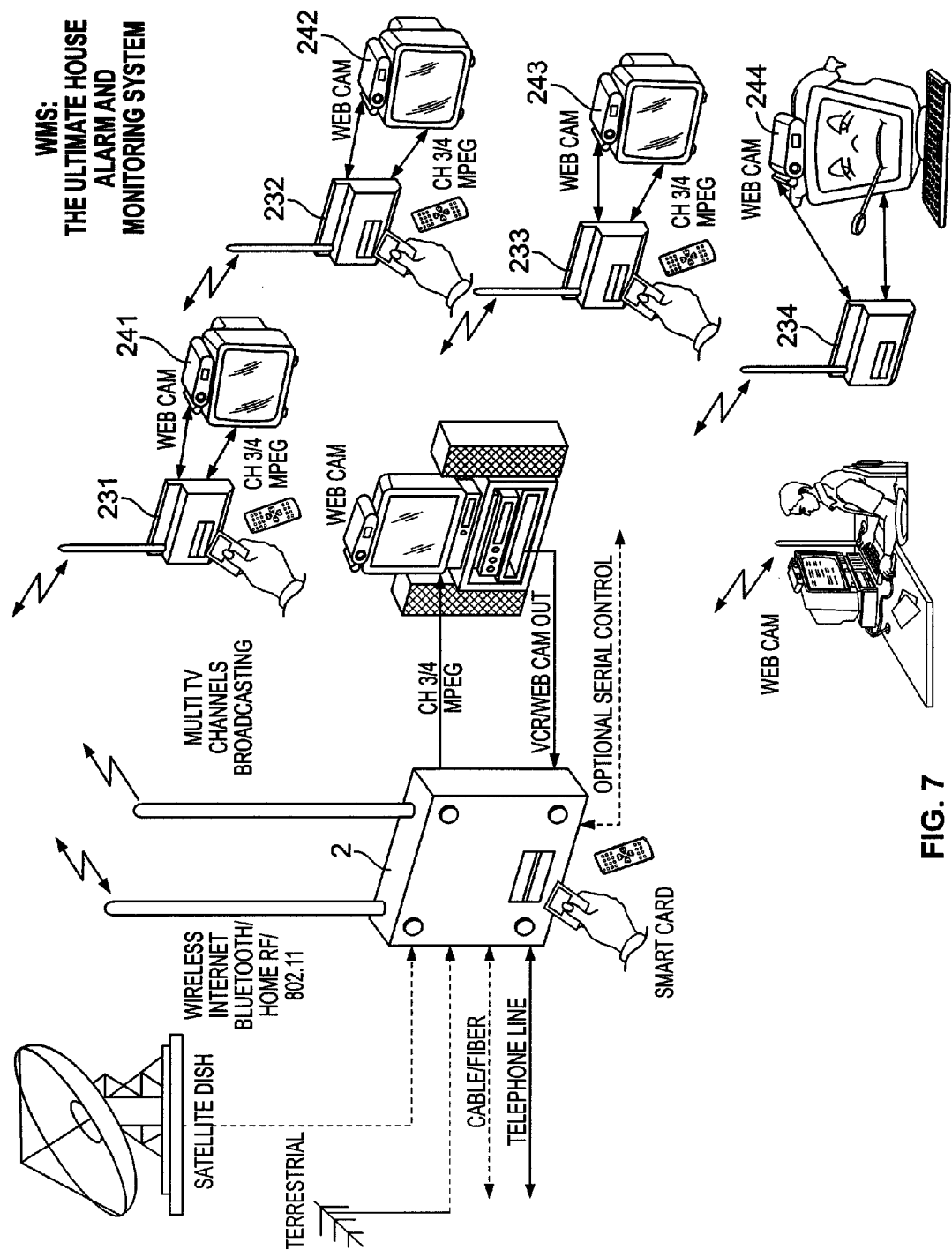
FIG. 7 is representational block diagram of the invention as an alarm and remote monitor.
Figure 8:
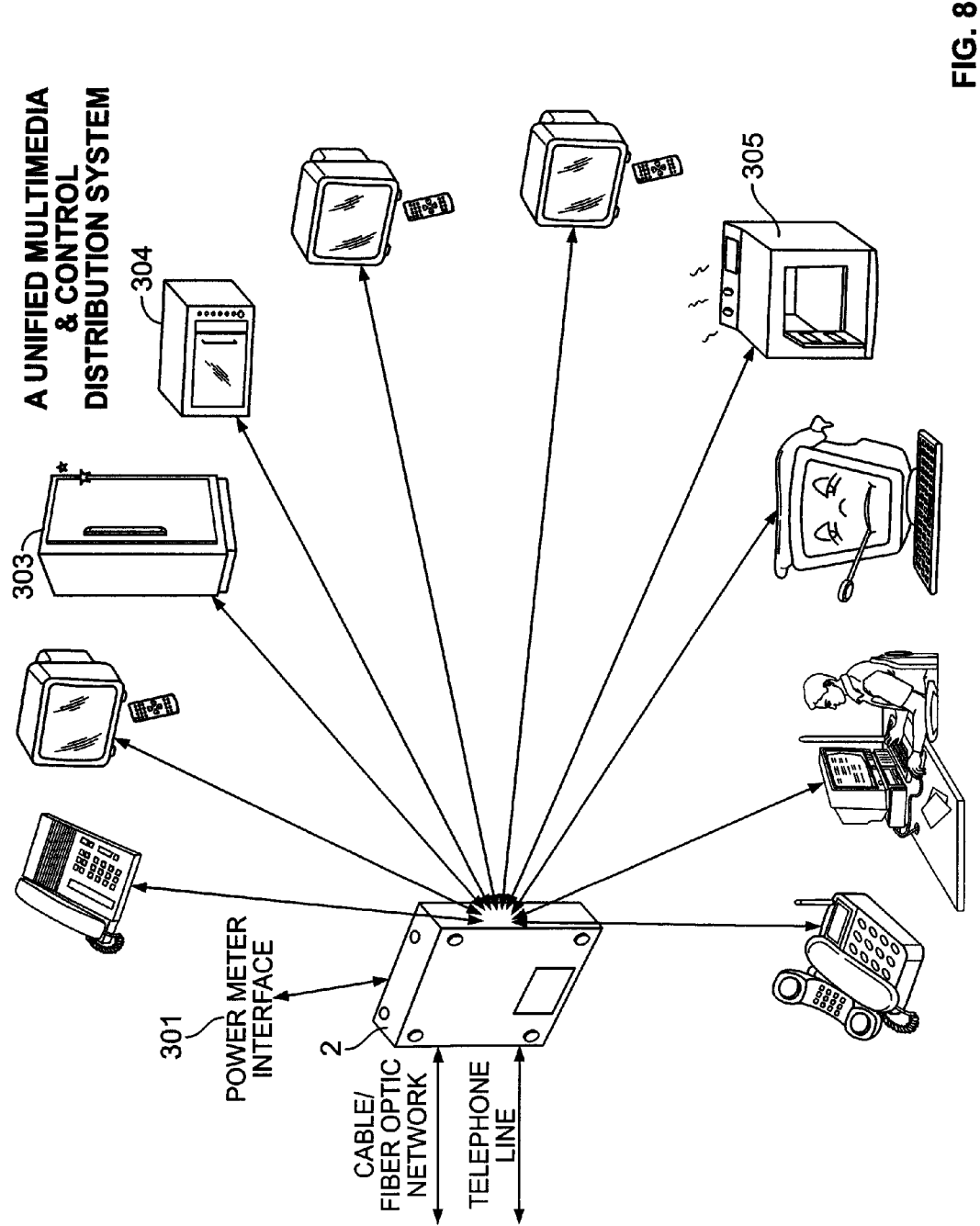
FIG. 8 is a similar diagram of the invention controlling appliances.

The system can be an alarm (FIG. 7) or monitoring system (FIG. 7-8). Software can allow the EU's 231-234 to monitor sensors such as sound, video 241-244, sump level, motion 241-244, electrical consumption 301 (FIG. 8), gas use, water use, and temperature.

The EU's can also be capable of controlling heating, ventilation, AC and home appliances 303-305.

The smart card can allow a subscriber to control and monitor his home remotely wherever he has access to a compatible system, or over modem or Internet connection.

Examples of the invention include the following.

EXAMPLE I

A customer premises system including
a wireless multimedia center (WMC) for reception on said premises from one or more signal sources and for distribution of segments of signals from signal sources through the wireless multimedia center
to a plurality of end units, in which:
the signals include video or audio signals and broadband data;
the wireless multimedia center receives all the signals and distributes segments of said signals via a transmitter;
the video signals are transmitted by orthogonal frequency division multiplexing (OFDM) in which
all signals are added together and summed as an orthogonal array having dimensions of time, frequency and amplitude, to transmit spread spectrum multiplexed signals, in which each pulse including said signals has sufficiently long individual pulse widths to defeat multi-path, reflection and absorption phase induced losses;
the video signals are distributed to one or more end units;
the end units communicate with the wireless multimedia center, controlling which segments of which signals are distributed to each end unit.

EXAMPLE II

A customer premises system including
a wireless multimedia center (WMC) for reception on said premises from one or more signal sources and for distribution of segments of signals from signal sources through the wireless multimedia center
to a plurality of end units, in which:
the signals include video signals and broadband data;
the wireless multimedia center receives all the signals and distributes segments of said signals via a transmitter;
the video signals are transmitted by orthogonal frequency division multiplexing (OFDM) in which
all signals are added together and summed as an orthogonal array having dimensions of time, frequency and amplitude, to transmit spread spectrum multiplexed signals, in which each pulse including said signals has sufficiently long individual pulse widths to defeat multi-path, reflection and absorption phase induced losses;
the video signals are distributed to one or more end units;
the end units communicate with the wireless multimedia center, controlling which segments of which signals are distributed to each end unit;
the broadband data is distributed to and received from one or more communication end units (CEU's);
the end unit receiving video signals is a video end unit (VEU);
the system has a separate bi-directional wideband data pipe which provides, as demanded, control for the video channels, data transfer, or plain old telephone service;
all the transmissions are encrypted;
the separate bi-directional wideband data channel is soft RF;
a remote control unit controls each video end unit (VEU);
the OFDM is a coded orthogonal frequency division multiple access (COFDMA);
the system is capable of a data transfer rate of 200 megabits/second or more;
the wireless multimedia center (WMC) transmits and receives telephone service signals to the communications end unit, for use by telephones;
the wireless multimedia center transmits broadband data signals to the communications end unit for use by data terminals, such as network linked computers;
the wireless multimedia center (WMC) transmits conventional coded digital cordless telephone signals to conventional cordless telephones;
the wireless multimedia center or the end unit reads a user smart card for instruction as to a level of service authorized to said user, so that the user can utilize his authorized level of service on any premises in which he can place his smart card in the system;
the wireless multimedia center communicates viewing information about use per TV set, to a service provider, for use in evaluating television viewing habits, as for example for obtaining television ratings in real time;
the wireless multimedia center communicates viewing information from the premises for use in royalty distribution assessment;
the viewing information is used by the provider to personalize advertising to the viewer in any media, for example phone messages or TV graphics;
one of the dimensions of the Transmission is direction;
one of the dimensions of the Transmission is power;
one of the dimensions of the Transmission is polarization;
the system has a startup procedure including one or more steps from the following group:
the wireless multimedia center seeks the end units by broadcasting instructions and listening to responses of the end units;
the wireless multimedia center registers said end units;
the wireless multimedia center dynamically tests error rates to see which direction and polarization and power levels are best;
the EU announces its presence and registers with the appropriate WMC;
the OFDM transmits any analog video broadcast standard signal, such as NTSC, PAL and/or SECAM;
the OFDM transmits any digital video standard signal, such as DVB, DV and/or ATSC;

the system is an alarm and monitoring system which is capable of controlling heating, ventilation, AC and home appliances;

which is capable of monitoring for sound, video, sump level, motion and temperature;

in which the data can be encrypted between service provider and WMC; encrypted to differentiate between VEUs; encrypted to prevent eavesdropping, and encrypted to minimize interference;

the Video End Unit supports picture-in-picture;

in which each smart card has it's own viewing rules, so, for example, a customer can exercise parental control over youthful holders of smart cards on the customer's account;

the WMC is adapted to serve as a VEU for a local TV;

the system supports services such as central DVD, time shift programming, and the like;

the system software can be updated and upgraded and maintained remotely by the service provider.

We claim:

1. A multimedia device for use in an indoor, multi-room, home or business, building environment, comprising:
   a distribution box located in one of the rooms of the indoor, multi-room, building environment and having at least one input for receiving a signal from at least one of a wireless source and a wired source, the signal having at least one of an audio component and a video component; and
   an orthogonal frequency division multiplexing (OFDM) transceiver operatively connected to the at least one input of the distribution box, and operative for wirelessly and unidirectionally broadcasting the signal using OFDM modulation inside the indoor, multi-room, building environment from the distribution box in the room in multiple directions to a plurality of end units, at least one of the end units being located in another room separated by a wall from the one room of the indoor, multi-room, building environment, the at least one end unit receiving the unidirectionally broadcast signal through the wall via packets each having a width of sufficient duration to resist multi-path reflection and absorption phase induced losses.

2. The device of claim 1, wherein the OFDM transceiver includes an antenna for unidirectionally broadcasting the signal.

3. The device of claim 2, wherein the end units include an audio/visual unit, and wherein the signal has audio and video components, and wherein the antenna unidirectionally broadcasts the audio and video components to the audio/visual unit.

4. The device of claim 2, wherein the end units include an audio unit, and wherein the signal has an audio component, and wherein the antenna unidirectionally broadcasts the audio component to the audio unit.

5. The device of claim 2, wherein the end units include a video unit, and wherein the signal has a video component, and wherein the antenna unidirectionally broadcasts the video component to the video unit.

6. The device of claim 1, wherein the OFDM transceiver broadcasts the signal at a low energy level to minimize interference with other signals.

7. A multimedia system, comprising:
   a distribution box located in one room of an indoor, multi-room, home or business building environment and having at least one input for receiving a signal from at least one of a wireless source and a wired source, the signal having at least one of an audio component and a video component;
   a plurality of end units, at least one of the end units being located in another room separated by a wall from the one room of the indoor, multi-room building environment; and
   an orthogonal frequency division multiplexing (OFDM) transceiver operatively connected to the at least one input of the distribution box, and operative for wirelessly and unidirectionally broadcasting the signal using OFDM modulation inside the indoor, multi-room, building environment from the distribution box in the one room in multiple directions to the plurality of end units, the at least one end unit receiving the unidirectionally broadcast signal through the wall via packets each having a width of sufficient duration to resist multi-path reflection and absorption phase induced losses.

8. The system of claim 7, wherein the end units are selected from a group comprising at least one of a video end unit, an audio end unit, an audio/visual unit, and a voice end unit.

9. The system of claim 7, and a remote controller for generating a control signal to select the signal to be broadcast to the end units.

10. The system of claim 7, wherein the OFDM transceiver includes an antenna for unidirectionally broadcasting the signal.

11. The system of claim 10, wherein the end units include an audio/visual unit, and wherein the signal has audio and video components, and wherein the antenna unidirectionally broadcasts the audio and video components to the audio/visual unit.

12. The system of claim 10, wherein the end units include an audio unit, and wherein the signal has an audio component, and wherein the antenna unidirectionally broadcasts the audio component to the audio unit.

13. The system of claim 10, wherein the end units include a video unit, and wherein the signal has a video component, and wherein the antenna unidirectionally broadcasts the video component to the video unit.

14. The system of claim 7, wherein the OFDM transceiver broadcasts the signal at a low energy level to minimize interference with other signals.

15. The system of claim 7, wherein the distribution box is further operative for registering at least one of the end units during a start-up mode.

16. A multimedia distribution method, comprising:
   receiving a signal from at least one of a wireless source and a wired source in one room of an indoor, multi-room, home or business, building environment, the signal having at least one of an audio component and a video component;
   locating at least one of a plurality of end units in another room separated by a wall from the one room of the indoor, multi-room, building environment; and
   wirelessly and unidirectionally broadcasting the signal using OFDM modulation inside the indoor, multi-room, building environment, with an orthogonal frequency division multiplexing (OFDM) transceiver, in the one room in multiple directions to the plurality of end units, and receiving the unidirectionally broadcast signal through the wall at the one end unit via packets each having a width of sufficient duration to resist multi-path reflection and absorption phase induced losses.

17. The method of claim 16, and selecting the end units from a group comprising at least one of a video end unit, an audio end unit, an audio/visual unit, and a voice end unit.

18. The method of claim 16, and generating a control signal to select the signal to be broadcast to at least one of the end units.

19. The method of claim 16, and unidirectionally broadcasting the signal from an antenna.

20. The method of claim 19, wherein the end units include an audio/visual unit, and wherein the signal has audio and video components, and wherein the broadcasting is performed by unidirectionally broadcasting the audio and video components to the audio/visual unit via the antenna.

21. The method of claim 19, wherein the end units include an audio unit, and wherein the signal has an audio component, and wherein the broadcasting is performed by unidirectionally broadcasting the audio component to the audio unit via the antenna.

22. The method of claim 19, wherein the end units include a video unit, and wherein the signal has a video component, and wherein the broadcasting is performed by unidirectionally broadcasting the video component to the video unit via the antenna.

23. The method of claim 16, and broadcasting the signal at a low energy level to minimize interference with other signals.

* * * * *